United States Patent [19]

Sato et al.

[11] Patent Number: 4,710,434
[45] Date of Patent: Dec. 1, 1987

[54] OPTOMAGNETIC RECORDING MEDIUM

[75] Inventors: Noboru Sato, Kanagawa; Kazutaka Habu, Tokyo; Sanae Abe, Chiba, all of Japan

[73] Assignee: Sony Corporation, Tokyo, Japan

[21] Appl. No.: 808,991

[22] Filed: Dec. 16, 1985

[30] Foreign Application Priority Data

Dec. 17, 1984 [JP] Japan ................... 59-265640

[51] Int. Cl.$^4$ .............................................. G11B 7/24
[52] U.S. Cl. ................... 428/678; 428/694; 428/900; 428/928
[58] Field of Search ............ 428/694, 900, 928, 641, 428/678; 360/131, 134; 365/122; 369/288

[56] References Cited

U.S. PATENT DOCUMENTS

| | | | |
|---|---|---|---|
| 3,965,463 | 6/1976 | Chaudhari et al. | 340/174 TF |
| 4,293,621 | 10/1981 | Togami | 428/900 |
| 4,347,112 | 8/1982 | Togami | 427/255.7 |
| 4,497,870 | 2/1985 | Kudo et al. | 428/900 |
| 4,556,291 | 12/1985 | Chen | 350/377 |
| 4,576,699 | 3/1986 | Sato et al. | 428/900 |

FOREIGN PATENT DOCUMENTS

| | | | |
|---|---|---|---|
| 3317101 | 11/1983 | Fed. Rep. of Germany | |
| 6542 | 1/1983 | Japan | |
| 145541 | 8/1985 | Japan | 369/288 |
| 145543 | 8/1985 | Japan | 369/288 |

OTHER PUBLICATIONS

V. Sadagopan, "Magneto-Optic Materials", IBM TDB, vol. 12, No. 10, Mar. 1970, p. 1586.

Primary Examiner—George F. Lesmes
Assistant Examiner—William M. Atkinson
Attorney, Agent, or Firm—Hill, Van Santen, Steadman & Simpson

[57] ABSTRACT

An optomagnetic recording medium utilizing both rare earth metals and transition metals in the optomagnetic recording system. From 15 to 35 atomic % of the recording medium on the nonmagnetic base consists of one of the rare earth metals gadolinium (Gd), terbium (Tb) or dysprosium (Dy) with the balance being an alloyed mixture of iron (Fe), cobalt (Co) and germanium (Ge). The optomagnetic recording material of the present invention has an increased phase transition temperature without a rise in its Curie point, and provides satisfactory recording and erasing under temperature conditions up to near the Curie point.

6 Claims, 4 Drawing Figures

FIG. 4

| | Ms (emu/cc) | Tcry (°C) | θk (°) | C/N (dB) | TC (°C) |
|---|---|---|---|---|---|
| Tb20(Fe95Co5)80 | 270 | 230 | 0.39 | 48.5 | 190 |
| Tb20(Fe90Co5Ge5)80 | 210 | 300 | 0.39 | 49.0 | 190 |
| Tb20(Fe85Co5Ge10)80 | 180 | 320 | 0.39 | 47.5 | 180 |
| Tb20(Fe90Co10)80 | 290 | 230 | 0.42 | | 240 |
| Tb20(Fe85Co10Ge5)80 | 210 | 300 | 0.42 | 48.5 | 240 |
| (DyTb)20(Fe95Co5)80 | 110 | 240 | 0.33 | 48.5 | 160 |
| (DyTb)20(Fe90Co5Ge5)80 | 110 | 300 | 0.35 | | 160 |
| Dy20(Fe95Co5)80 | 80 | 230 | 0.29 | | 140 |
| Dy20(Fe90Co5Ge5)80 | 70 | 300 | 0.32 | | 140 |

OPTOMAGNETIC RECORDING MEDIUM

BACKGROUND OF THE INVENTION

1. Field of the Invention

The present invention is in the field of compositions for rewritable optomagnetic recording media.

2. Description of the Prior Art

In rewritable optomagnetic recording media for recording and reading information under the irradiation of light, a magnetic membrane for optomagnetic recording has been formed with a thin film system composed of the combination of an amorphous rare earth and a transition metal (hereinafter referred to as the RE-TM system).

In the case where the optomagnetic recording with the RE-TM system is carried out using ferromagnetic vertical magnetization of the RE-TM system, the recording is effected only in the amorphous state of the magnetic membrane and the ferromagnetic property is eliminated in the crystalline state where the recorded information is lost or recording of the information becomes impossible. Accordingly, it is desirable in the RE-TM system utilizing a magnetic membrane for optomagnetic recording that the phase transition temperature, Tcry, be as high as possible. The phase transition temperature of the RE-TM system is about 240° C. in the systems Tb-FeCo, Gd-FeCo and Dy-FeCo.

On the other hand, where the information recording or erasing is carried out by a so-called Curie point recording, it must be carried out at an elevated temperature near the Curie point of the RE-TM magnetic membrane which is about 100° to 300° C. Accordingly, if the phase transition temperature is low, the phase transition occurs on recording and erasure resulting in degradation of the magnetic properties or elimination of the ferromagnetic property. Further, since thermal diffusion of the constituent elements occurs even at room temperature in the amorphous RE-TM system magnetic membrane, degradation in the magnetic property results during long time storage even at room temperature in the case of a low phase transition temperature.

Consequently, development of an RE-TM magnetic material having a sufficiently high phase transition temperature to be significantly above the Curie point is desired for an RE-TM magnetic membrane of this type. On the other hand, it is also desirable that the Kerr rotation angle $\theta k$ be as great as possible in order to obtain a high signal-to-noise (S/N) or carrier to noise (C/N) ratio. It is also desired that the recording bit diameter be smaller in order to improve the recording density. The minimum diameter d for the recording bit is represented by:

$$d \alpha \frac{Ew}{Ms \cdot Hc} \quad (1)$$

where Ms is the saturation magnetization, Hc is the coercive force and Ew is the magnetic wall energy. Thus, high Ms and Hc values are desired for the RE-TM magnetic material in a recording medium of this kind. In conventional RE-TM magnetic membranes of the prior art, there has been a problem in that the phase transition temperature has been generally too low.

Japanese Patent Application No. 57-58868, published Oct. 15, 1983, describes an optomagnetic recording medium made of an alloyed layer having uniaxial magnetic anisotropy composed of an amorphous rare earth metal and a transition metal system, the alloyed layer comprising at least one atomic % germanium.

There is also a publication entitled "Magneto-Optic Type Erasable Disk Memory", published in October, 1984 by Sony Corporation which describes a magneto-optical layer of Tb-FeCo.

SUMMARY OF THE INVENTION

The present invention provides an optomagnetic recording medium which has an increased phase transition temperature without an increase in the Curie point and has a large Kerr rotating angle $\theta k$, and also has satisfactory saturation magnetization and coercive force.

The objectives of the present invention are achieved by using an optomagnetic recording medium of the rare earth metal-transition metal (RE-TM) type consisting of from 15 to 35 atomic % of at least one of the rare metals gadolinium (Gd), terbium (Tb), or dysprosium (Dy), with the remainder being a transition metal mixture composed of a mixture of iron (Fe), cobalt (Co) and germanium (Ge) in which the mixture consists of 1 to 14 atomic % of Ge, 5 to 10 atomic % of Co, and the balance essentially Fe.

In the RE-TM magnetic membrane containing from 1 to 14 atomic % of Ge in accordance with this invention, the phase transition temperature Tcry from the amorphous phase to the crystalline phase can be increased by several tens to one hundred or more degrees centigrade with no rise in the Curie point.

BRIEF DESCRIPTION OF THE DRAWINGS

The invention will be described by way of a preferred embodiment, with reference to the accompanying drawings.

FIG. 4 is a graph illustrating the results of measurements for various properties of the magnetic membrane of varying compositions.

DESCRIPTION OF THE PREFERRED EMBODIMENTS

The optomagnetic recording medium according to the present invention can be prepared by sputtering an RE-TM magnetic membrane on a nonmagnetic substrate such as glass, plastic, or aluminum.

Figure 1:
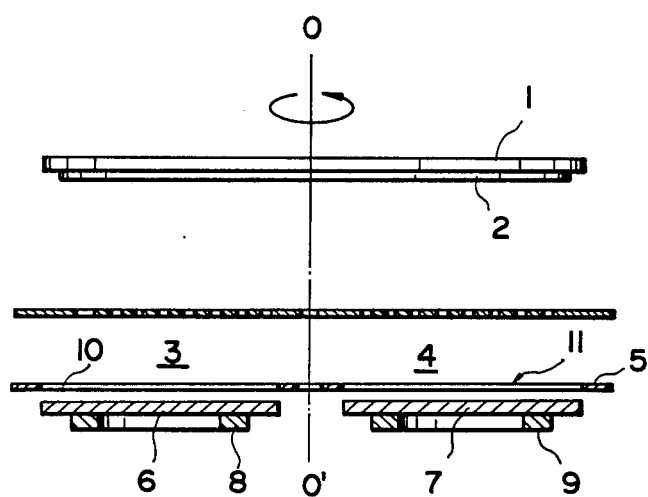
FIG. 1 is a schematic view of one embodiment of a sputtering device for preparing an optomagnetic recording medium according to this invention.

For carrying out the sputtering as described above, a sputtering apparatus of the magnetron type can be used, and a schematic structure embodying such an embodiment is shown in FIG. 1.

Figure 2:
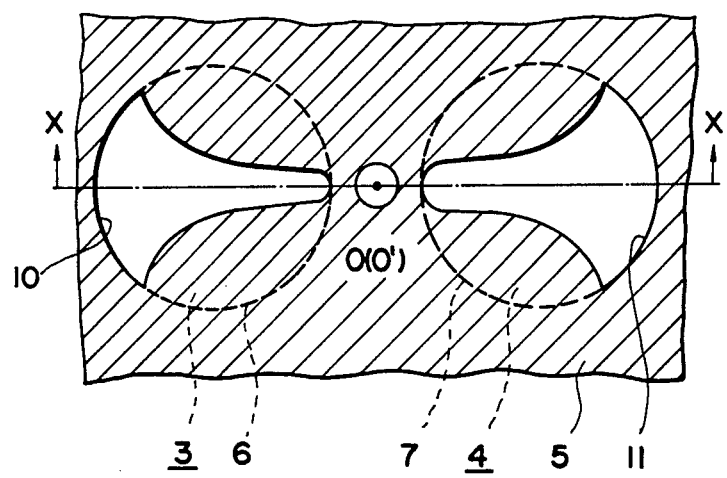
FIG. 2 is a plan view of a mask which can be used in accordance with the present invention.

A base plate 1 rotates around an axial center O—O' which is disposed within a bell jar (not illustrated) and a substrate 2 composed of glass, plastic or the like constituting the substrate for the optomagnetic recording medium is disposed, for example, at the lower surface of the base plate. Two sputtering sources 3 and 4 are disposed in opposing relation to the base plate 2 at equal angle intervals, for example, 180° angular interval relative to the axial center O—O' as the midline. A mask 5 for controlling the sputtering position of the metals sputtered from the sputtering sources 3 and 4 is disposed between the sources 3 and 4 and the base plate 1 which carries the substrate 2. The sputtering source 3 has a target 6 composed, for example, of a plate-like rare earth metal material while the sputtering source 4 has a target 7 composed, for example, of a plate-like alloy or transition metals alloyed with Ge. Reference numerals 8 and 9 represent magnets. As shown, for example, in FIG. 2 the mask 5 is provided with windows 10 and 11 at positions opposite to the targets 6 and 7, each having a fanlike configuration which is symmetrical with respect to a line x passing through the centers for the targets 6 and 7, and gradually diverging toward both sides of the line x. In FIG. 2, the area of the windows 10 and 11 of the mask are shown as identical, but they can be optionally varied depending on the compositions of the magnetic membrane to be formed on the substrate 2.

In the apparatus shown, a DC sputtering is carried out while rotating the base plate 1, using the targets 6 and 7 as the cathode.

The magnetic membrane formed on the substrate 2 consists of a magnetic membrane in which the layers enriched in the rare earth metal from the target 6 and the layers enriched in the transition metals and Ge from the target 7 are successively disposed in alternate relation.

EXAMPLE 1

In the sputtering apparatus as shown in FIGS. 1 and 2, the target 6 was composed of Tb and the other target 7 was composed of $Fe_{90}Co_5Ge_5$ (90 atomic % Fe, 5 atomic % Co, and 5 atomic % Ge). Sputtering was carried out on the substrate 2 while rotating the base plate 1 in an argon gas atmosphere to form a magnetic membrane from several hundred Angstroms to 1 micron in thickness.

The deposition proceeds as described in the copending application of Sato et al, U.S. Pat. No. 4,576,699, which disclosure is incorporated herein by reference. Specifically, the rare earth metal layers and the transition metal layers are deposited on the base in an alternating multilayer structure wherein the compositional ratio between the rare earth metal and the transition metals is cyclically changed in the direction of the thickness of the recording layer. It is desirable for each of the rare metal layers and each of the transition metal layers to diffuse the respective metals into the previously deposited and adjacent transition metal layers, and the rare earth metal layer, so that a layer composed only of rare earth metal or only of transition metals is precluded from being formed.

Typical reaction conditions for the sputtering process include rotation of the base plate 1 at a speed of one rotation for 3 seconds for 6 minutes for a total of 120 rotations.

The magnetic membrane thus formed had a composition of $Tb_{20}(Fe_{90}Co_5Ge_5)_{80}$ as a whole. The atomic ratios were determined by electron probe micro analysis which involves detecting the specular X-rays radiated by electron beam irradiation on the deposited multilayer. The phase transition temperature Tcry of the magnetic membrane was about 300° C. By way of comparison, the phase transition temperature of the $Tb_{20}(Fe_{95}Co_5)_{80}$ not containing any Ge was 230° C.

Figure 3:
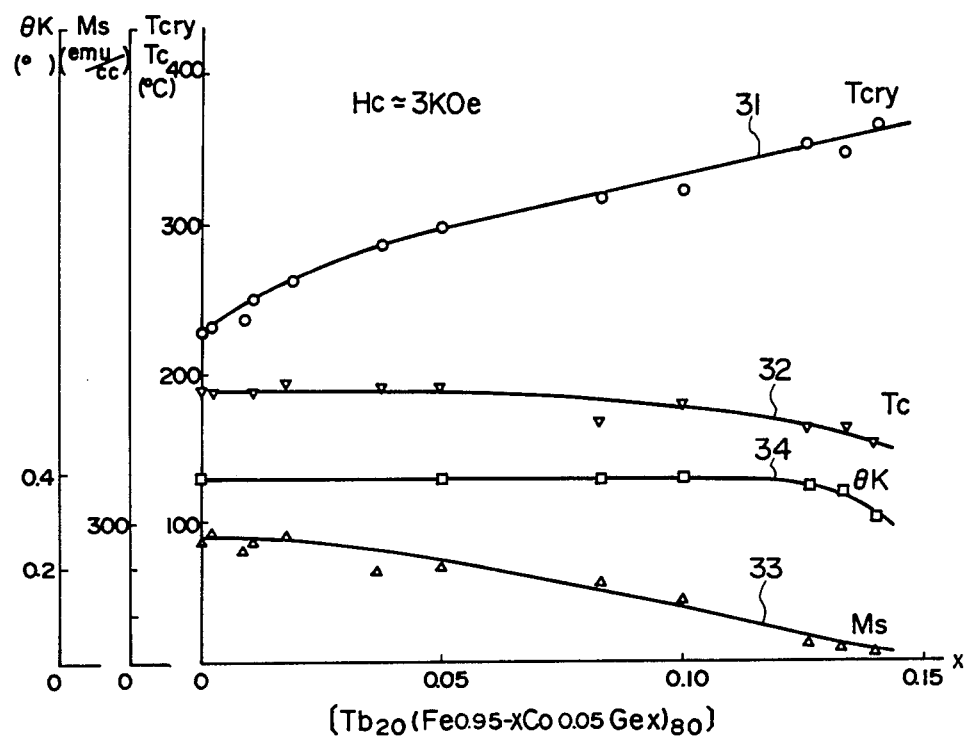
FIG. 3 is a graph illustrating the result of measurements of various properties of a Tb-FeCoGe alloy with reference to the amount of Ge added.

Various properties were measured for each of the optomagnetic recording media obtained by varying the amount of Ge added, that is, by varying the value of x in the expression $Tb_{20}(Fe_{95-x}Co_5Ge_x)_{80}$ in Example 1, and the results of these measurements are shown in FIG. 3. Shown are the results of the measurement of the phase transition temperature at line 31, the Curie temperature Tc at line 32, the saturation magnetization Ms at 33, and the Kerr rotating angle $\theta k$ at line 34 in each of the media. The respective media had coercive force values Hc of about 3000 Oe.

The various properties for the RE-TM compositions with and without added Ge were compared and the results are shown in the chart of FIG. 4. As seen from this chart, the phase transition temperature was increased with no rise in the Curie point Tc and the Kerr rotating angle $\theta k$ was also improved when Ge was added as compared with conventional compositions containing no Ge.

In the present invention, the amount of Ge added to the transition metal layer is in the range from 1 to 14 atomic % for the following reasons. Since the phase transition temperature can be increased by more than 15° C. with the addition of Ge in an amount more than 1 atomic %, the amount of Co added can also be increased, for example, to 10 atomic % or greater so that a higher Kerr rotating angle $\theta k$ can be obtained, and the C/N ratio can be improved. In the absence of Ge, if the Co content exceeds 5 atomic %, the Curie point Tc becomes close to or exceeds the phase transition point Tcry. However, if Ge is added by more than 1 atomic %, the amount of Co added can be increased beyond 5 atomic % and even 10 atomic % or higher. Furthermore, germanium does not alloy effectively with rare earth metals.

The content of the rare earth metal is chosen to be in the range of 15 to 35 atomic % because both the coercive force Hc and the Kerr rotating angle $\theta k$ are substantially reduced when the rare earth metal content is below 15 atomic % or above 35 atomic %.

As described above, since the phase transition temperature Tcry can be increased without raising the Curie point by the addition of Ge according to this invention, it is possible to obtain a stable optomagnetic recording medium that can satisfactorily record and erase the information upon heating to a temperature near the Curie point, and suffers no aging changes in its magnetic properties.

It will be evident that various modifications can be made to the described embodiments without departing from the scope of the present invention.

We claim as our invention:

1. An optomagnetic recording medium comprising a non-magnetic base and a recording layer on said base having an overall composition of from 15 to 35 atomic % of at least one of the metals Gd, Tb, and Dy, with the remainder being composed of a mixture of Fe, Co, and Ge, said mixture containing 1 to 14 atomic % Ge, 5 to 10 atomic % Co and the balance essentially Fe, said recording layer being formed of alternately superposed layers in which some of said layers are enriched with at least one of said metals Gd, Tb, and Dy, and the others of said layers being enriched with said mixture of Fe, Co, and Ge.

2. An optomagnetic recording medium according to claim 1 said recording layer having the overall analysis $Tb_{20}(Fe_{90}Co_5Ge_5)_{80}$.

3. An optomagnetic recording medium according to claim 1 wherein said recording layer has the overall composition represented by $Tb_{20}(Fe_{85}Co_5Ge_{10})_{80}$.

4. An optomagnetic recording medium according to claim 1 wherein said recording layer has the overall analysis $Tb_{20}(Fe_{85}Co_{10}Ge_5)_{80}$.

5. An optomagnetic recording medium according to claim 1 wherein said magnetic layer has the overall composition $(DyTb)_{20}(Fe_{90}Co_5Ge_5)_{80}$.

6. An optomagnetic recording medium according to claim 1 wherein said recording layer has the overall analysis $(Dy_{20})(Fe_{90}Co_5Ge_5)_{80}$.

* * * * *